US010123030B2

(12) United States Patent
Wang et al.

(10) Patent No.: US 10,123,030 B2
(45) Date of Patent: Nov. 6, 2018

(54) STREAMING ADAPTION BASED ON CLEAN RANDOM ACCESS (CRA) PICTURES

(71) Applicant: QUALCOMM Incorporated, San Diego, CA (US)

(72) Inventors: Ye-Kui Wang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 14/977,248

(22) Filed: Dec. 21, 2015

(65) Prior Publication Data

US 2016/0112712 A1    Apr. 21, 2016

Related U.S. Application Data

(63) Continuation of application No. 13/773,060, filed on Feb. 21, 2013, now Pat. No. 9,225,978.

(Continued)

(51) Int. Cl.
*H04N 19/44* (2014.01)
*H04N 19/00* (2014.01)
(Continued)

(52) U.S. Cl.
CPC ........... *H04N 19/44* (2014.11); *H04N 19/00* (2013.01); *H04N 19/102* (2014.11);
(Continued)

(58) Field of Classification Search
CPC ............ H04N 21/8451; H04N 5/783; H04N 21/6332; H04N 21/4348; H04N 19/70;
(Continued)

(56) References Cited

U.S. PATENT DOCUMENTS 7,782,946 B2   8/2010   Jeon et al.
9,225,978 B2   12/2015  Wang et al.
(Continued)

FOREIGN PATENT DOCUMENTS

CN   1618236 A     5/2005
CN   101860751 A   10/2010
(Continued)

OTHER PUBLICATIONS

Benjamin Bross "WD5:Working Draft5 of HEVC"; JCTVC-G1103_d2 Geneva, CH Nov. 21-30, 2011.*
(Continued)

*Primary Examiner* — Dramos Kalapodas
(74) *Attorney, Agent, or Firm* — Shumaker & Sieffert, P.A.

(57) ABSTRACT

Systems, methods, and devices for processing video data are disclosed. A message is received at a video decoding device, the message comprising an external indication from a source device external to the video decoding device. A video bitstream is received at the video decoding device, wherein the video bitstream comprises compressed video data and wherein the video bitstream is received separately from the message. A value of a HandleCraAsBla flag is set to a value specified by the message and CRA pictures are processed as BLA pictures based on the value of the HandleCraAsBla flag. A value of a second flag is set based on the value of the HandleCraAsBla flag, the second flag being indicative of whether at least one picture decoded prior to decoding of the CRA picture is to be output.

13 Claims, 8 Drawing Sheets

US 10,123,030 B2
Page 2

Related U.S. Application Data

(60) Provisional application No. 61/665,667, filed on Jun. 28, 2012.

(51) Int. Cl.

| | | |
|---|---|---|
| H04N 19/70 | (2014.01) | |
| H04N 19/172 | (2014.01) | |
| H04N 19/46 | (2014.01) | |
| H04N 19/134 | (2014.01) | |
| H04N 19/102 | (2014.01) | |
| H04N 19/177 | (2014.01) | |
| H04N 21/234 | (2011.01) | |
| H04N 21/6336 | (2011.01) | |
| H04N 21/647 | (2011.01) | |
| H04N 19/42 | (2014.01) | |
| H04N 19/52 | (2014.01) | |
| H04N 19/593 | (2014.01) | |
| H04N 19/85 | (2014.01) | |
| H04N 19/142 | (2014.01) | |
| H04N 19/162 | (2014.01) | |

(52) U.S. Cl.
CPC ......... *H04N 19/134* (2014.11); *H04N 19/172* (2014.11); *H04N 19/177* (2014.11); *H04N 19/42* (2014.11); *H04N 19/46* (2014.11); *H04N 19/52* (2014.11); *H04N 19/593* (2014.11); *H04N 19/70* (2014.11); *H04N 19/85* (2014.11); *H04N 21/23424* (2013.01); *H04N 21/6336* (2013.01); *H04N 21/64753* (2013.01); *H04N 19/142* (2014.11); *H04N 19/162* (2014.11)

(58) Field of Classification Search
CPC ......... H04N 21/4325; H04N 21/47217; H04N 21/8453; H04N 21/472; H04N 19/65; H04N 19/184; H04N 19/15; H04N 19/88; H04N 19/573; H04N 19/00945; H04N 19/00684; H04N 19/68; H04N 19/44; H04N 19/61; H04N 19/463; H04N 19/577; H04N 19/172; H04N 19/593; G11B 27/005; G11B 27/30; G11B 27/00
See application file for complete search history.

(56) References Cited

U.S. PATENT DOCUMENTS

| | | | |
|---|---|---|---|
| 2003/0156640 A1* | 8/2003 | Sullivan | H04N 21/8455 375/240.01 |
| 2003/0209375 A1 | 11/2003 | Suzuki et al. | |
| 2004/0066854 A1 | 4/2004 | Hannuksela | |
| 2004/0247188 A1 | 12/2004 | Luthra | |
| 2005/0123274 A1* | 6/2005 | Crinon | H04N 21/23424 386/241 |
| 2007/0217510 A1 | 9/2007 | Yamori et al. | |
| 2010/0254456 A1 | 10/2010 | Matsushita et al. | |
| 2011/0013890 A1 | 1/2011 | Sasaki et al. | |
| 2012/0106634 A1 | 5/2012 | Jeon et al. | |
| 2012/0185570 A1 | 7/2012 | Bouazizi et al. | |
| 2012/0230401 A1 | 9/2012 | Chen et al. | |
| 2012/0230433 A1 | 9/2012 | Chen et al. | |
| 2012/0246295 A1 | 9/2012 | Gonzalez-Banos et al. | |
| 2013/0064284 A1 | 3/2013 | Samuelsson et al. | |
| 2013/0077681 A1 | 3/2013 | Chen et al. | |
| 2013/0272430 A1* | 10/2013 | Sullivan | H04N 19/70 375/240.26 |
| 2014/0003536 A1 | 1/2014 | Wang et al. | |
| 2014/0092976 A1 | 4/2014 | Deshpande | |
| 2015/0043656 A1* | 2/2015 | Choi | H04N 19/597 375/240.26 |
| 2015/0085938 A1 | 3/2015 | Hendry et al. | |
| 2017/0142445 A1* | 5/2017 | Sullivan | H04N 19/70 |

FOREIGN PATENT DOCUMENTS

| | | |
|---|---|---|
| EP | 1986194 A2 | 10/2008 |
| JP | 2009521880 A | 6/2009 |
| JP | 2010507974 A | 3/2010 |
| RU | 2010111711 A | 10/2011 |
| TW | 200607359 A | 2/2006 |
| TW | 201210325 A | 3/2012 |
| WO | 2007076486 A2 | 7/2007 |
| WO | 2008051380 A2 | 5/2008 |
| WO | 2008083359 A1 | 7/2008 |
| WO | 2013157797 A1 | 10/2013 |
| WO | 2013158670 A1 | 10/2013 |
| WO | 2014003379 A1 | 1/2014 |

OTHER PUBLICATIONS

Bross, et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document JCTVC-L1003_v34, 310 pages.

Bross B., et al., "High efficiency video coding (HEVC) text specification draft 7 (JCTVC-I1003 d4) in v5.zip," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, vol. JCTVC-I1003_d4, Jun. 12, 2012 (Jun. 12, 2012), XP055077211.

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting, Stockholm, SE, Jul. 11-20, 2012, JCTVC-J1003_d7, 261.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pages.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Hendry, et al., "Random Access Detection and Notification", MPEG Meeting; Nov. 18, 2011; Geneva; (Motion Picture Expert Group or ISO/IEC JTC1/SC29/WG11), No. m21712, XP030050275, 6 pp.

International Preliminary Report on Patentability—PCT/US2013/046152, The International Bureau of WIPO—Geneva, Switzerland, dated Oct. 6, 2014 (11 pages).

International Search Report and Written Opinion—PCT/US2013/046152—ISAEPO—dated Sep. 9, 2013 (15 pages).

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

"ITU-T H.265, Series H: Audiovisual and Multimedia Systems, Infrastructure of audiovisual services—Coding of moving video, High efficiency video coding, the International Telecommunication Union, Oct. 2014, 540 pp.".

(56) References Cited

OTHER PUBLICATIONS

Kazui, et al., "AHG9: New high-level syntax for simple HEVC stream editing", MPEG Meeting; Jul. 16-20, 2012; Stockholm; (Motion Picture Expert Group or ISO/IEC JTC1/SC29/WG11), No. m25468, XP030053794, 11 pp.

Second Written Opinion from International Application No. PCT/US2013/046152, dated Jul. 3, 2014, 6 pp.

Sjoberg, et al., "Overview of HEVC high-level syntax and reference picture management", IEEE Transactions on Circuits and Systems for Video Technology, Jan. 2012 (Jan. 1, 2012), XP055045360, 14 pp.

Sullivan, "CRA pictures with broken links", MPEG Meeting; Apr. 30-May 4, 2012; Geneva; (Motion Picture Expert Group or ISO/IEC JTC1/SC29/WG11), No. m24653, XP030052996, 3 pp.

Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668.

Walker, et al., "Support for Storage of AVC Content in the MP4 File Format", MPEG Meeting; Jul. 22-26, 2002; Klagenfurt; (Motion Pictureexpert Group or ISO/IEC JTC1/SC29/WG11), No. M8708, Jul. 25, 2002; XP030037657, 38 pp.

Wang, "AHG9: On CRA and BLA pictures", JCT-VC Meeting; MPEG Meeting; Oct. 18-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0122, XP030113004, 3 pp.

Wang, et al., "AHG9: On RAP pictures", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0107, XP030112469, 7 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Prosecution History from U.S. Appl. No. 13/773,060, dated Mar. 25, 2015 through Nov. 27, 2015, 77 pp.

Bross B., et al., "High Efficiency Video Coding (HEVC) text specification draft?", Joint Collaborative Team on Video oding of ITU-T SG16 WP3 and ISO/IEC JTC1/SC29/WG11 9th Meeting; Geneva, Jun. 12, 2012, Section 7.4.3 and Annex C3.1-3.2, pp. 75-77,226-227.

Chen et al., "AHG15: Conforming bitstreams starting with CRA pictures", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTV-G319, Nov. 9, 2011, XP030110303, 6 pp.

Sjoberg, et al., "Overview of HEVC High-Level Syntax and Reference Picture Management," IEEE Transactions on Circuits and Systems for Video Technology, vol. 22 (12), XP011487804, Dec. 2012, pp. 1858-1870.

Sullivan, "CRA Pictures with Broken Links", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0404, Apr. 17, 2012, XP030112167, 2 pp.

Wang, et al., "System and Transport Interface of SVC", IEEE Transactions on Circuits and Systems for Video Technology, vol. 17, No. 9, pp. 1149-1163, Sep. 2007.

* cited by examiner

STREAMING ADAPTION BASED ON CLEAN RANDOM ACCESS (CRA) PICTURES

This application is a continuation of U.S. application Ser. No. 13/773,060, filed Feb. 21, 2013, and claims the benefit of U.S. Provisional Application No. 61/665,667, filed Jun. 28, 2012, the entire contents each of which are incorporated herein by reference.

TECHNICAL HELD

This disclosure generally relates to processing video data and, more particularly, to techniques for supporting random access in compressed video streams.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, transcoders, routers or other network devices, and the like. Digital video devices implement video compression techniques, such as those described in the standards defined by MPEG-2, MPEG-4, nu-T H.263, ITU-T H.264/MPEG-4, Part 10, Advanced Video Coding (AVC), the High Efficiency Video Coding (HEVC) standard presently under development, proprietary standards, open video compression formats such as VP8, and extensions of such standards, techniques, or formats. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transform-d from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In one example, the techniques of this disclosure relate to treating a clean random access (CRA) picture as a broken link access (BLA) picture based on an external indication. For example, a video decoder or other device may receive an external indication. The video decoder may then treat a CRA picture as a BLA picture based on the external indication. In some examples, a flag is defined for a CRA picture and the external indication indicates whether the flag should be set in the video decoder. Accordingly, the video decoder may set the flag based on the external indication. The decoder or some internal functionality, such as an external indication processing unit or a prediction module may then check the flag. In an example, the prediction module may treat a CFA picture as a BLA picture based on the external indication. For example, a decoder may treat the CRA picture as a BLA picture based on the flag.

In one example, the disclosure describes a method of processing video data that includes receiving, at a video decoding device, a message comprising an external indication from a source device external to the video decoding device, receiving, at the video decoding device, a video bitstream, wherein the video bitstream comprises compressed video data and wherein the video bitstream is received separately from the message comprising the external indication, setting a value of a HandleCraAsBla flag to a value specified by the message, the HandleCraAsBla flag being indicative of whether a clean random access (CRA) picture is to be processed as a broken link access (BLA) picture, processing the CRA picture as a BLA picture based on the value of the HandleCraAsBla flag and, based on the value of the HandleCraAsBla flag, setting a value of a second flag, the second flag being indicative of whether at least one picture decoded prior to decoding of the CRA picture is to be output.

In another example, the disclosure describes a video decoder for processing video data, including memory configured to store video data and a processor in communication with the memory, the processor configured to receive, at the video decoding device, a message comprising an external indication from a source device external to the video decoding device, receive, at the video decoding device, a video bitstream, wherein the video bitstream comprises compressed video data and wherein the video bitstream is received separately from the message comprising the external indication, set a value of a HandleCraAsBla flag to a value specified by the message, the HandleCraAsBla flag being indicative of whether a clean random access (CRA) picture is to be processed as a BLA picture, process the CRA picture as a broken link access (BLA) picture based on the value of the HandleCraAsBla flag and based on the value of the HandleCraAsBla flag, set a value of a second flag, the second flag being indicative of whether at least one picture decoded prior to decoding of the CRA picture is to be output.

In another example, the disclosure describes a video decoder for processing video data that includes storage means for storing video data, means for receiving a message comprising an external indication from a source device external to the video decoding device, means for receiving a video bitstream, wherein the video bitstream comprises compressed video data and wherein the video bitstream is received separately from the message comprising the external indication, means for setting a value of a HandleCraAsBla flag to a value specified by the message, the HandleCraAsBla flag being indicative of whether a clean random access (CRA) picture is to be processed as a BLA picture, means for processing the CRA picture as a broken link access (BLA) picture based on the value of the HandleCraAsBla flag and means for, based on the value of the HandleCraAsBla flag, setting a value of a second flag, the second flag being indicative of whether at least one picture decoded prior to decoding of the CRA picture is to be output.

In another example, the disclosure describes a computer-readable storage medium. The computer-readable storage medium having stored thereon instructions that, when executed, cause one or more processors of a video decoding device to receive, at the video decoding device, a message comprising an external indication from a source device external to the video decoding device, receive, at the video decoding device, a video bitstream, wherein the video bitstream comprises compressed video data and wherein the video bitstream is received separately from the message comprising the external indication, set a value of a HandleCraAsBla flag to a value specified by the message, the HandleCraAsBla flag being indicative of whether a clean random access (CRA) picture is to be processed as a BLA picture, process the CRA picture as a broken link access (BLA) picture based on the value of the HandleCraAsBla flag, and based on the value of the HandleCraAsBla flag, set a value of a second flag, the second flag being indicative of whether at least one picture decoded prior to decoding of the CRA picture is to be output.

The details of one or more examples are set forth in the accompanying drawings and the description below. Other features, objects, and advantages will be apparent from the description and drawings, and from the claims.

DETAILED DESCRIPTION

Figure 1:
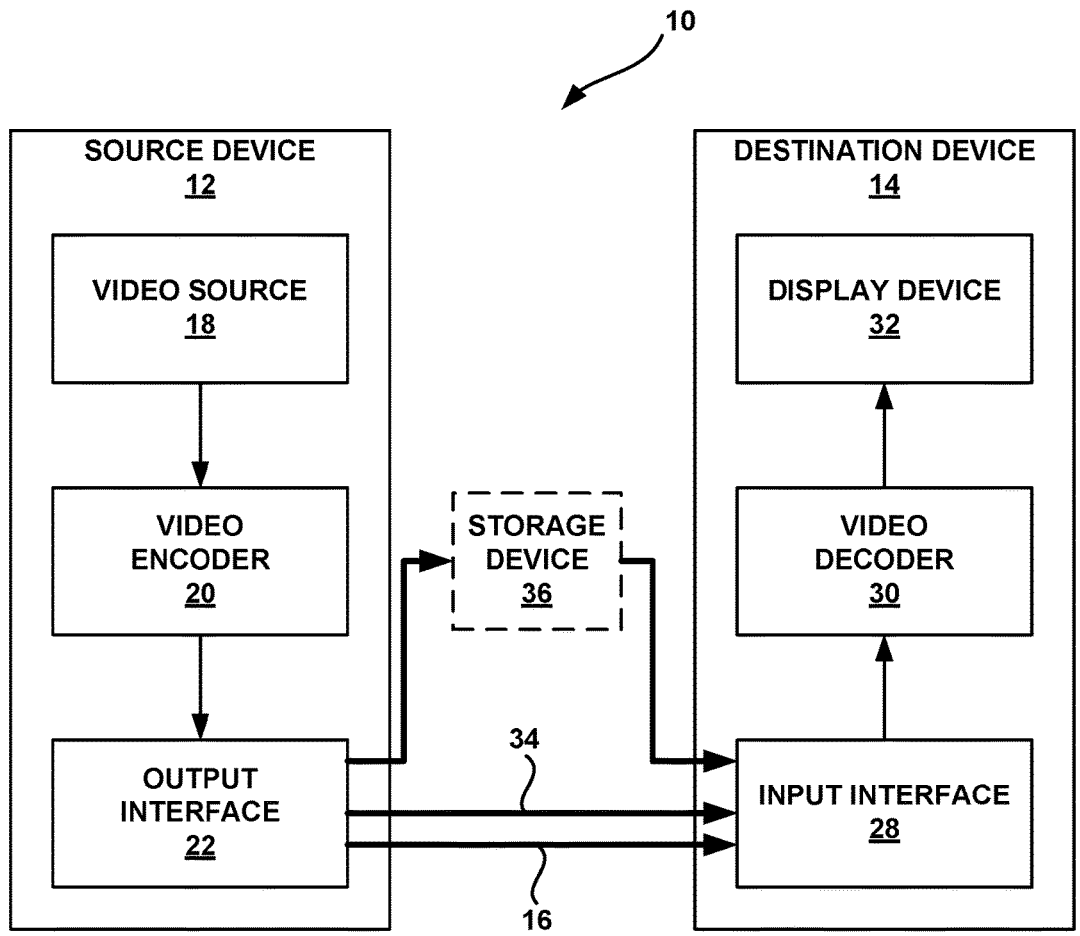
FIG. 1 is a block diagram illustrating an example video encoding and decoding system that may utilize the techniques described in this disclosure.

This disclosure describes techniques for streaming adaption based on clean random access (CRA) pictures. Various improved video coding designs are described, which may be related to streaming adaptation based on CRA pictures, output of pictures before random access point (RAP) pictures, and signaling of picture timing information.

A brief background of some video coding standards is first described. Video coding standards include ITU-T H.261, ISO/IEC MPEG-1 Visual, ITU-T H.262 or ISO/EC MPEG-2 Visual, ITU-T 171.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG), A Working Draft (WD) of HEVC, and referred to as HEVC WD7 hereinafter, is available from http://phenix.int-evry.fr/jct/doc_end_user/documents/9_Geneva/wg11/JCTVC-I1003-v5.zip, the entire content of which is incorporated herein by reference.

A more recent Working Draft (WD) of HEVC, and referred to as HEVC WD9 hereinafter, is available from http://phenix.int-evry.fr/jct/doc_end_user/documents/9_Geneva/wg11/JCTVC-I1003-v10.zip, the entire content of which is incorporated herein by reference.

In one example, the techniques of this disclosure relate to treating a clean random access (CRA) picture as a broken link access (BLA) picture based on an external indication. For example, a video decoder or other device may receive an external indication. The video decoder may then treat a CRA picture as a BLA picture based on the external indication. In some examples, a flag is defined for a CRA picture and the external indication indicates whether the flag should be set in the video decoder. Accordingly, the video decoder may set the flag based on the external indication. The decoder or some internal functionality, such as an external indication processing unit or a prediction module may then check the flag. In an example, the prediction module may treat a CRA picture as a BLA picture based on the external indication. For example, a decoder may treat the CRA picture as a BLA picture based on the flag.

In another example, a flag is defined for a CRA picture and a decoder or other device may receive an external indication that the flag should be set. The decoder or other device may then set the flag based on the external indication. The decoder then check the flag. When the flag is set, the decoder may treat the CRA picture as a BLA picture.

Random access refers to the decoding of a video bitstream starting from a coded picture that is not the first coded picture in the bitstream. Random access to a bitstream is needed in many video applications, such as broadcasting and streaming, e.g., for users to switch between different channels, to jump to specific parts of the video, or to switch to a different bitstream for stream adaptation (e.g., of the bit rate, frame rate, spatial resolution, and so on). This feature may be enabled by inserting random access pictures or random access points, many times in regular intervals, into the video bitstream.

Bitstream splicing refers to the concatenation of two or more bitstreams or parts thereof. For example, a first bitstream may be appended to a second bitstream, possibly with some modifications to either one or both of the bitstreams, to generate a spliced bitstream. The first coded picture in the second bitstream is also referred to as the splicing point. Therefore, pictures following the splicing point in the spliced bitstream originate from the second bitstream while pictures preceding the splicing point in the spliced bitstream originate from the first bitstream.

Bitstream splicers may perform splicing of bitstreams. Bitstream splicers are often less complicated, less sophisticated and/or less intelligent than encoders. For example, they may not be equipped with entropy decoding and encoding capabilities. Bitstream splicers may be incorporated into any of the devices described herein, including coding devices or network devices.

Bitstream switching may be used in adaptive streaming environments. A bitstream switching operation at a certain picture in the switch-to bitstream is effectively a bitstream splicing operation wherein the splicing point is the bitstream switching point, i.e., the first picture from the switch-to bitstream.

Instantaneous decoding refresh (IDR) pictures as specified in AVC or HEVC can be used for random access. However, because pictures following an IDR picture in a decoding order cannot use pictures decoded prior to the MR picture as a reference, bitstreams relying on IDR pictures for random access can have significantly lower coding efficiency.

To improve coding efficiency, the concept of clean random access (CRA) pictures was introduced in HEVC to allow pictures that follow a CRA picture in decoding order but precede it in output order to use pictures decoded before the CRA picture as a reference. Pictures that follow a CRA picture in decoding order but precede the CRA picture in output order are referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be non-correctly-decodable when random access from the CRA picture occurs. Hence, decoders typically discard the leading pictures during random access decoding. To prevent error propagation from reference pictures that may not be available depending on where the decoding starts, all pictures that follow a CRA picture both in decoding order and output order shall not use any picture that precedes the CRA picture either in decoding order or output order (which includes the leading pictures) as reference.

The concept of a broken link access (BLA) picture was further introduced in HEVC after the introduction of CRA pictures and based on the concept of CRA pictures. A BLA picture typically originates from bitstream splicing at the position of a CRA picture, and in the spliced bitstream, the splicing point CRA picture may be changed to a BLA picture. IDR picture, CRA picture and BLA picture are collectively referred to as random access point (RAP) pictures.

One difference between BLA pictures and CRA pictures is as follows. For a CRA picture, the associated leading pictures are correctly decodable if the decoding starts from a RAP picture before the CRA picture in decoding order. The CRA picture may be non-correctly-decodable when random access from the CRA picture occurs. For example, when the decoding starts from the CRA picture, or in other words, when the CRA picture is the first picture in the bitstream. For a BLA picture, the associated leading pictures may be non-correctly-decodable in all cases, even when the decoding starts from a RAP picture before the BLA picture in decoding order.

For a particular CRA or BLA picture, some of the associated leading pictures are correctly decodable even when the CRA or BLA picture is the first picture in the bitstream. These leading pictures are referred to as decodable leading pictures (DLPs), and other leading pictures are referred to as non-decodable leading pictures (NLPs) or random access decodable leading (RADL) pictures. NLPs are also referred to as tagged for discard (TFD) pictures or as random access skipping leading (RASL) pictures.

In some cases, the following problems may be associated with some existing methods (1) in streaming adaptation based on CRA pictures, changing of a CRA picture to a BLA picture typically needs to be performed by a media server or an intermediate network element, e.g. a media-aware network element (MANE) or even a media-unaware network element such as an HTTP cache or web proxy, MANE, which is typically preferable to be less complicated, less sophisticated and/or less intelligent and may not be able to change the bitstream at all, (2) output of pictures before an IDR or BLA picture in decoding order can be somehow controlled by using the no_output_of_prior_pics_flag. When no_output_of_prior_pics_flag is set to "1" or inferred to be equal to 1, decoded pictures earlier in decoding order than the IDR or BLA picture are all discarded after decoding of the IDR or BLA picture without output/display. However, sometimes displaying more of those pictures may provide better user experience. Currently there is not a way to enable output/display more picture in such situations, (3) DLP pictures are allowed to be output. Since their output order or output times are earlier than the associated RAP picture, the earliest presentation time when random accessing from the RAP picture cannot be known by simply checking the access unit containing the RAP picture. However, when random accessing from a RAP picture, the system should try to figure out the earliest playback start to see whether that RAP picture fits the random access request from the user.

A number of techniques are set forth in this disclosure that may generally address or improve upon one or more of the above identified problems. A number of different ways of handling such a message, received or inferred, are possible. Several examples are discussed below; these include (1) handling a CRA picture as a BLA picture, (2) changing of a CRA picture to a BLA picture, and (3) handling a CRA picture as a CRA picture that starts a bitstream.

In an example, a decoder may handle a CRA picture as a BLA picture. A decoder may be configured such that a CRA picture is handled as a BLA picture when it is indicated so by an external means. Such an external indication can be a message as described above (that certain CRA picture should be handled as a BLA picture) that is passed to the decoder, by a function of the decoder side, through inference or reception from a server or an intermediate network element.

More specifically, the decoding process may be changed to be as follows. A separate variable that may be associated with each CRA picture may be used. For example, the variable HandleCraAsBlaFlag is associated with each CRA picture. In other words, each CRA picture may have a HandleCraAsBlaFlag variable (also referred to as a flag) associated with it. The value of HandleCraAsBlaFlag for some CRA pictures may be specified by external means. When the value of HandleCraAsBlaFlag for a particular CRA picture is not specified by external means, it may be set to "0" (e.g., HandleCraAsBlaFlag of a CRA picture by default is "0," with the value "0" indicating that a CRA picture is not treated as a BLA picture). In such an example, a value of "1" may indicate that a CRA picture is treated as a BLA picture. In other examples, the opposite may be true, a value of "1" may indicate that a CRA picture is not treated as a BLA picture and a value of "0" may indicate that a CRA picture is treated as a BLA picture.

The following example assumes the case when Handle-CraAsBlaFlag defaults to a value of "0" indicating that a CRA picture is not treated as a BLA picture and a value of "1" indicating that a CRA picture is treated as a BLA picture. When decoding (including parsing) each coded slice NAL unit, if HandleCraAsBlaFlag is equal to "1," e.g., handle a CRA picture as a BLA picture, and nal_unit_type indicates a CRA picture (e.g. the value is equal to "4" or "5" according to HEVC WD7), the following applies, (1) the value of nal_unit_type is changed to indicate a BLA picture (e.g. the value is increased by 2 according to HEVC WD7), (2) the value of no_output_of_prior_pics_flag is set to 1, (3) if the previous picture in decoding order is a RAP picture and the rap_pic_id of the current slice is equal to the rap_pic_id of the previous picture, the following applies. First, if the next picture in decoding order is not a RAP picture, the value of rap_pic_id of the current slice is changed to be different than the rap_pic_id of the previous picture in decoding order, but still in the allowed value range of the syntax element. Second, otherwise (the next picture in decoding order is a RAP picture), the value of rap_pic_id of the current picture is changed to be a value that is different than the rap_pic_id of both the previous picture and the next picture in decoding order, hut still in the allowed value range of the syntax element.

Alternatively, when changing of a CRA picture to a BLA picture, a decoder may perform the following, if the picture timing SEI messages are present and the DPB output times for all pictures in the DPB are smaller than the DPB output time of the current picture, the value of no_output_of_prior_pics_flag is set to 1; otherwise if the value of no_output_of_prior_pics_flag is set to "0".

In some examples, HandleCraAsBlaFlag may be a first flag and the no_output_of_prior_pictures_flag may be a second flag. In some examples, the no_output_of_prior_pictures flag may be a context variable.

With the above changes to HEVC WD7, it may be possible to further remove the special decoding processes for a CRA picture that is the first picture in the bitstream and the associated TFD pictures. In this case, when a bitstream starts with a CRA picture, the first CRA picture in the bitstream should be handled as a BLA picture, by setting the value of HandleCraAsBlaFlag to "1" for the bitstream-starting CRA picture, regardless of whether the value is specified by the external means, if any, and applying the above changed decoding process.

Alternatively, when decoding (including parsing) each coded slice NAL unit, if the current picture is the first picture in the bitstream and nal_unit_type indicates a CRA picture (e.g. the value is equal to "4" or "5" per HEVC WD7), the following may apply, the value of nal_unit_type is changed to indicate a BLA picture (e.g. the value is increased by 2 per HEVC WD5). In this example, there is no need to change the values of no_output_of_prior_pics_flag and rap_pic_id. Alternatively, the value of HandleCraAsBlaFlag may be indicated by a syntax element in the bitstream, e.g. a new syntax element that may be included in the slice header or a new SEI message.

One example relates to a streaming adaptation based on CRA pictures. In such an example, instead of relying on a server or an intermediate network element to change a BLA picture to a CRA picture, a server or an intermediate network element generate a message to be sent to the decoder side (i.e. the client). The message may notify a decoder, for example, that a bitstream switching operation has occurred at certain CRA picture and that CRA picture should be handled as a BLA picture. In the context of dynamic adaptive streaming over HTTP (DASH), the decoder side may also infer such a message by itself through the change of the uniform resource locator (URL) it used for requesting stream data and the reception of the media data associated with the changed URL.

In another example, a CRA picture may be changed such that if picture timing SEI messages are present and the DPB output times for all pictures in the DPB are smaller than the DPB output time of the current picture. The value of no_output_of_prior_pics_flag may be set to 1. Otherwise the value of no_output_of_prior_pics_flag may be set to "0".

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. The techniques described herein generally relate to treating a CRA picture as a BLA picture based on an external indication. Accordingly, these techniques may generally apply to the destination device 14, which may generally receive the external indication and in response to such an external indication, may treat a CRA picture received at the destination device as a BLA picture when processed within the destination device. In some examples however, source device 12 or another network device, such as a MANE may provide an external indication to destination device 14 that causes destination device 14 to treat a CRA picture received at the destination device as a BLA picture.

Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. A modulator may modulate the encoded video data according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, input interface may access encoded data from storage device 32. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 36 may correspond to a file server or another intermediate storage device that may hold the encoded video generated by source device 12. Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device. For example, a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

Video encoder 20 may encode the captured, pre-captured, or computer-generated video. The encoded video data may be transmitted directly to destination device 14 via output interface 22 of source device 12. Alternatively, the encoded video data may be stored onto storage device 36 for later access by destination device 14 or other devices, for decoding and/or playback. In other examples both of these may be performed.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 36, may include a variety of syntax elements generated by video encoder 20 for use by a video decoder, such as video decoder 30, in decoding the video data. Such syntax elements may be included with the encoded video data transmitted on a communication medium, stored on ask/rage medium, or stored a file server.

In one example, video decoder 30 or other device may receive an external indication. Video decoder 30 may then treat a clean random access (CRA) picture as a broken link access (BLA) picture based on the external indication. In some examples, the external indication indicates whether a flag should be set in the video decoder. Accordingly, the video decoder 30 may set the flag based on the external indication. The video decoder 30 may or some internal functionality, such as an external indication processing unit 72 or a prediction module 81 may then check the flag. In an example, the prediction module 81 may treat a CRA picture as a BLA picture based on the external indication that indicates that the CRA picture should be treated as a BLA pictures based on the flag.

In another example, video decoder 30 or another device may receive an external indication that a flag should be set. Video decoder 30 or another device may then set the flag based on the external indication. Decoder 30 may then check the flag. When the flag is set video decoder 30 treats the CRA picture as a BLA picture.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of HEVC is available, as of Jun. 27, 2012, from http://wg11.sc29.org/jct/doc_end_user/current_document.php?id=5885/JCTVC-I1003-v5, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263, as well as open formats such as VP8.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of coding tree blocks or treeblocks or largest coding units (LCU) that include both luma and chroma samples. A treeblock may have a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU may be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y>16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or aft of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with this disclosure, source device 12 (or possibly another intermediate device not shown in FIG. 1) may provide an external indication 34 to destination device 14 that causes destination device 14 to treat a CRA picture received at the destination device as BLA picture. For example, source device 12 (or possibly another intermediate device not shown in FIG. 1) may determine that a change has been made by a user, such as requesting video of a different resolution or quality, or a broken link may occur. When a change in resolution or a broken link occurs, for example, this may mean that a CRA picture should be treated as a BLA picture because any prior picture information stored on the receiving device may not be valid for decoding the incoming bitstream.

Figure 2:
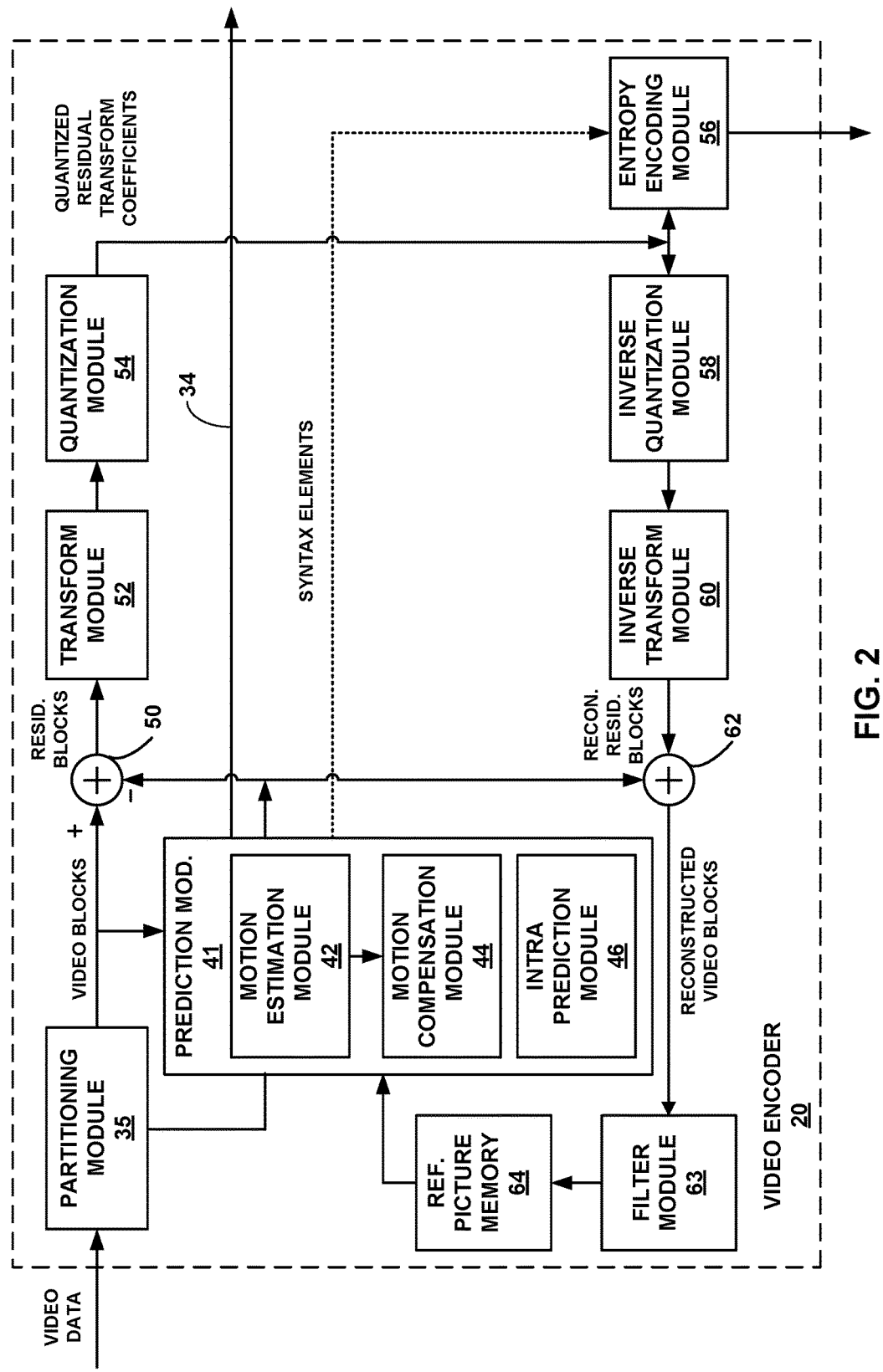
FIG. 2 is a block diagram illustrating an example video encoder that may implement the techniques described in this disclosure.

FIG. 2 is a block diagram illustrating an example video encoder 20 that may implement the techniques described in this disclosure. As discussed above, the techniques described herein generally relate to treating a CRA picture as a BLA picture based on an external indication received at the destination device 14. In some examples however, source device 12 or another network device, such as a MANE may provide an external indication to destination device 14 that causes destination device 14 to treat a CRA picture received at the destination device as a BLA picture.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning module 35, prediction module 41, filter module 63, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. Filter module 63 is intended to represent one or more loop filters such as a deblocking filter, an adaptive loop filter (ALF), and a sample adaptive offset (SAO) filter. Although filter module 63 is shown in FIG. 2 as being an in loop filter, in other configurations, filter module 63 may be implemented as a post loop filter.

Source device 12 or another network device, such as a MANE may provide an external indication 34 to destination device 14 that causes destination device 14 to treat a CPA picture received at the destination device as a BLA picture. For example, external indication 34, which is generally external to the destination device 14, and generally not transmitted as part of the bitstream, may be generated by prediction module 41, which may have access to indications related to the status of the bitstream. This is only one example, however, other units or modules in source device 12, or in other devices external to source device 12, may also generate an external indication.

As shown in FIG. 2, video encoder 20 receives video data, and partitioning module 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

Motion estimation module 42 may be configured to determine the inter-prediction mode for a video slice according to a predetermined pattern for a video sequence. The predetermined pattern may designate video slices in the sequence as P slices, B slices or GPB slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PC of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include bath luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting intra-prediction mode for a block, intra-prediction module 46 may provide information indicative of the selected intra-prediction mode for the block to entropy coding module 56. Entropy coding module 56 may encode the information indicating the selected intra-prediction mode in accordance with the techniques of this disclosure. Video encoder 20 may include configuration data in the transmitted bitstream. The configuration data may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

Video encoder 20 of FIG. 2 represents an example of a video encoder that may be configured to signal that a clean random access (CRA) picture should be treated as a broken link access (BRA) picture, as described herein.

Figure 3:
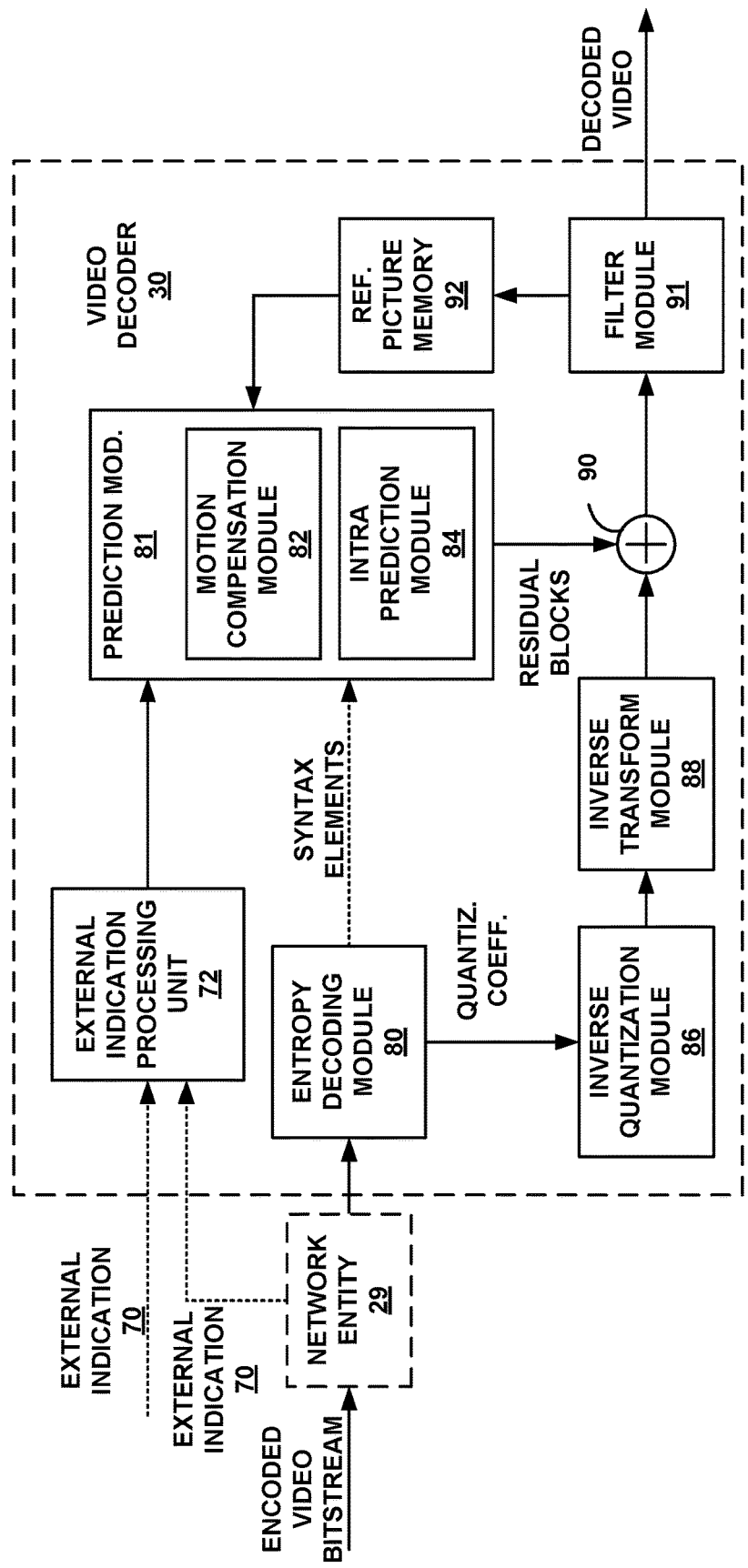
FIG. 3 is a block diagram illustrating an example video decoder that may implement the techniques described in this disclosure.

FIG. 3 is a block diagram illustrating an example video decoder 30 that may implement the techniques of this disclosure, which generally relate to treating a CRA picture as a BLA picture based on an external indication 70, which may be generated by a network entity 29, such as a MANE or some other external device (not shown) In one example, a video decoder 30 receives an external indication 70 that a flag 74 should be set. The external indication 70 is received by video decoder 30. In other examples, external indication 70 may be received and processed external to video decoder 30. External indication processing unit 72 sets the flag 74 based on the external indication. The flag is then passed to prediction module 81. In the illustrated example, external indication processing unit 72 is within video decoder 30. In other examples, external indication processing unit 72 may be external to and separate from video decoder 30. At a video decoder 30, prediction module (81) checks the flag and when the flag is set treats one clean random access (CRA) picture as a broken link access (BLA) picture.

In some examples, a default value of the flag is "0" and a set value of the flag is "1." In other examples, the opposite may be true, the default value of the flag is "1" and a set value of the flag is "0." In other words, the flag may be active high ("1") or active low ("0").

In some examples, when decoding a coded slice Network Abstraction Layer (NAL) unit, if the first flag is set, prediction module 81 may change a NAL unit type of the NAL unit. When decoding the coded slice Network Abstraction Layer (NAL) unit, if the first flag is set, prediction module 81 may change a value of a second flag. The second flag may be the no_output_of_prior_pics_flag. Additionally, when decoding the coded slice Network Abstraction Layer (NAL) unit, if the flag is set, the prediction module may set the value of a second flag to "1."

In an example, when a current picture is a CRA picture, and when some external indication is available to set a variable indicating that a CRA picture should be handled as a BLA picture (e.g., HandleCraAsBlaFlag) then the variable (e.g., HandleCraAsBlaFlag) may be set to the value provided by the external means. Otherwise, the value of the variable (e.g., HandleCraAsBlaFlag) may be set to indicate that the CRA picture is not to be handled as a BRA picture. For example, the HandleCraAsBlaFlag may be set to "1" to indicate that the CRA picture is to be handled as a BRA picture and set to "0" to indicate that the CRA picture is not to be handled as a BRA picture.

It should be noted that, while some examples of external indication may be described herein, these are not intended to be an exhaustive list. Many possible external indications could be used.

In some examples, when the current picture is a CRA picture and variable indicating that a CRA picture should be handled as a BLA picture (e.g., HandleCraAsBlaFlag) is equal to "1," where "1" indicates that the CRA picture should be handled as a BLA picture, the value of no_output_of_prior_pics_flag may be set to "1," and the following applies during the parsing and decoding processes for each coded slice segment NAL unit In an example, the no_output_of_prior_pics_flag specifies how the previously-decoded pictures in the decoded picture buffer are treated after decoding of an IDR or a BLA picture. In an example, when the IDR or BLA picture is the first picture in the bitstream, the value of no_output_of_prior_pics_flag has no effect on the decoding process. When the IDR or BLA picture is not the picture in the bitstream and the value of pic_width_in_luma_samples or pic_height_in_luma_samples or sps_max_dec_pic_buffering[sps_max_temporal_layers_minus1] derived from the active sequence parameter set is different from the value of pic_width_in_luma_samples or pic_height_in_luma_samples or sps_max_ dec_pic_buffering [sps_max_temporal_layers_minus1] derived from the sequence parameter set active for the preceding picture, no_output_of_prior_pics_flag equal to "1" may (but should not) be inferred by the decoder, regardless of the actual value of no_output_of_prior_pics_flag.

In the example of FIG. 3, video decoder 30 includes an entropy decoding module 80, prediction module 81, inverse quantization module 86, inverse transformation module 88, summer 90, filter module 91, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a MANE, a video editor/splicer, or other such device configured to implement one or more of the techniques described above. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

As discussed above, a network device, such as network entity 29, which may be a MANE may provide an external indication 34 to destination device 14 that causes destination device 14 to treat a CRA picture received at the destination device as a BLA picture. For example, external indication 34, which is generally external to the destination device 14, and generally not transmitted as part of the bitstream, may be generated by prediction module 41, which may have access to indications related to the status of the bitstream. This is only one example, however, other units or modules in source device 12, or in other devices external to source device 12, may also generate an external indication.

Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 may use some of the received syntax elements to determine a prediction mode (e.g., intra- or inter-prediction) used to code the video blocks of the video slice, an inter-prediction slice type (e.g., B slice, P slice, or GPB slice). Additionally, motion compensation module 82 may use construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. If desired, loop filters (either in the coding loop or after the coding loop) may also be used to smooth pixel transitions, or otherwise improve the video quality. Filter module 91 is intended to represent one or more loop filters such as a deblocking filter, an adaptive loop filter (ALF), and a sample adaptive offset (SAO) filter. Although filter module 91 is shown in FIG. 3 as being an in loop filter, in other configurations, filter module 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Video decoder 30 of FIG. 3 represents an example of a video decoder configured to treat one clean random access (CRA) pictures as a broken link access (BRA) picture, as described herein.

Figure 4:
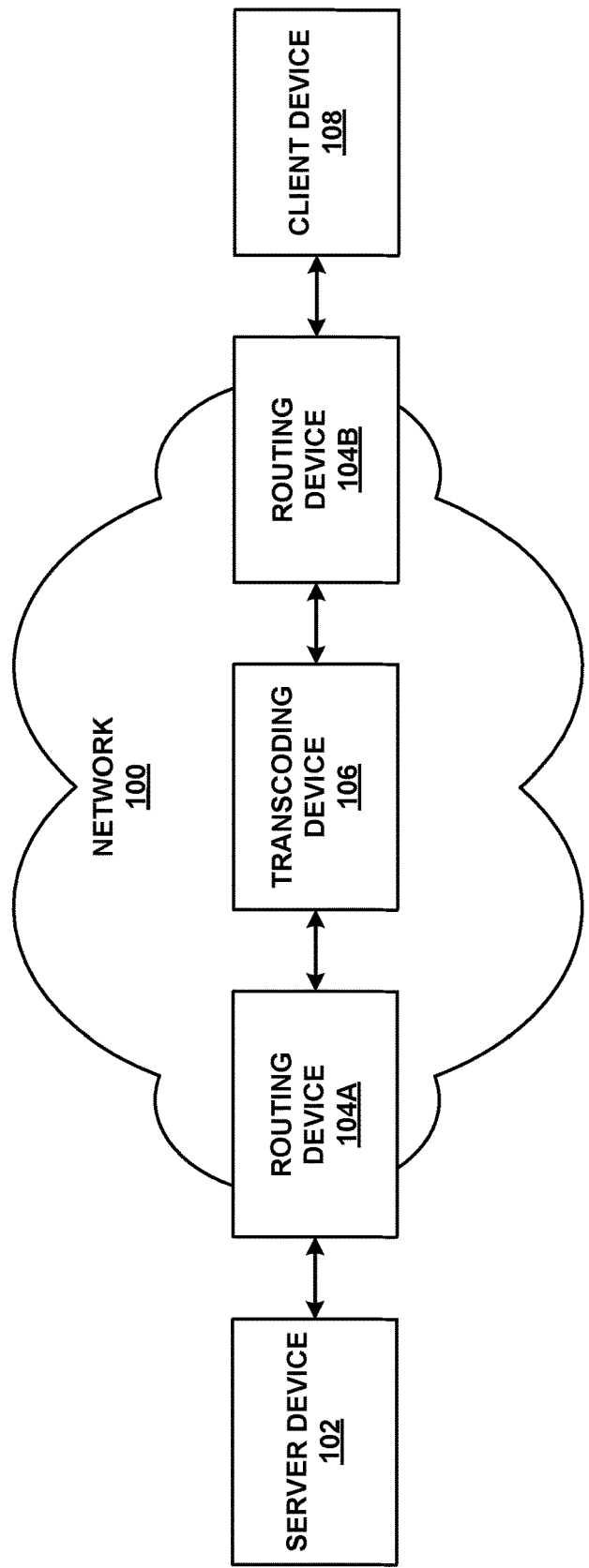
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples. Accordingly, server device 102 generally does not receive the external indication to treat a CRA picture as a BLA picture. Server 102 may provide an external indication 34 to client device 108 that causes client device 108 to treat a CRA picture received at the destination device as a BLA picture, however. Similarly, routing devices 104A, 104B (routing devices 104) and transcoding device 106 generally do not receive the external indication to treat a CRA picture as a BLA picture, but may provide an external indication 34 to client device 108 that client device 108 to treat a CRA picture received at the destination device as a BLA picture, however. Some examples described herein may include one or more of the following: network devices, servers MANEs, hypertext transfer protocol (HTTP) caches, or web proxies.

In some examples client device 108 may set the flag after receiving a message that a change in bit rate of a bit stream has occurred. Accordingly, the client device may set the flag based on the change of the bit rate. In some examples, a decoder in client device 108 may decode a coded slice NAL unit. A prediction module in a decoder in client device 108 may parse each coded slice NAL unit to identify the NAL unit type. Additionally, the prediction module may decode the coded slice NAL unit based on the NAL unit type.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure, including techniques recited in the CLAIMS portion of this disclosure. Moreover, the devices of FIG. 1 and encoder shown in FIG. 2 and the decoder shown in FIG. 3 are also exemplary devices that can be configured to perform the techniques of this disclosure, including techniques recited in the CLAIMS portion of this disclosure.

Figure 5:
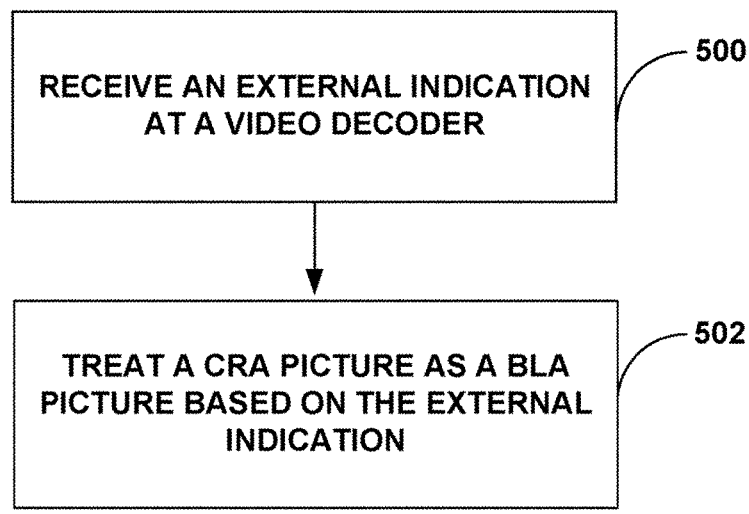
FIG. 5 is a flowchart illustrating an example method in accordance with one or more examples described in this disclosure.

FIG. 5 is a flow chart illustrating an example method in accordance with one or more examples described in this disclosure. In an example, video decoder 30 or other device receives an external indication (500). Video decoder 30 then treats a clean random access (CRA) picture as a broken link access (BLA) picture based on the external indication (502). In some examples, the external indication indicates whether a flag should be set in the video decoder. Accordingly, the video decoder may set the flag based on the external indication, as will be discussed in greater detail with respect to FIG. 6. The decoder may or some internal functionality, such as an external indication processing unit or a prediction module may then check the flag. In an example, the prediction module may treat the CRA picture as a BLA picture based on the external indication that indicates the CRA picture should be treated as a BLA picture based on the flag.

Figure 6:
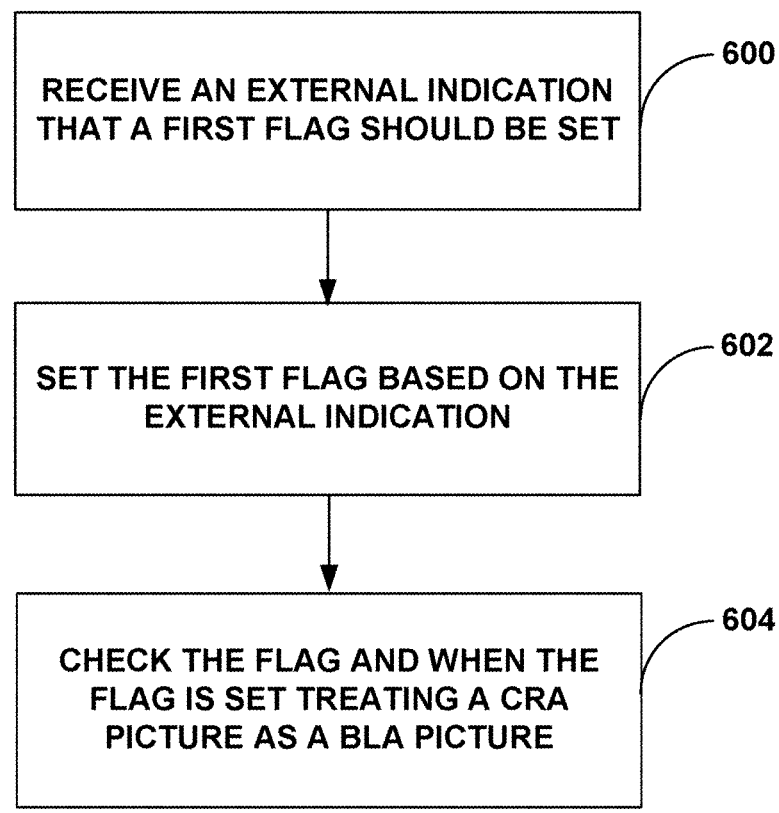
FIG. 6 is a flowchart illustrating an example method in accordance with one or more examples described in this disclosure.

FIG. 6 is a flow chart illustrating another example method in accordance with one or more examples described in this disclosure. In the illustrated example, a video decoder 30 receives an external indication 70 that a flag 74 should be set (600). In the illustrated example, the external indication 70 is received by video decoder 30. In other examples, external indication 70 may be received and processed external to video decoder 30.

External indication processing unit 72 sets the first flag 74 based on the external indication (602). The first flag is then passed to prediction module 81. In the illustrated example, external indication processing unit 72 is within video decoder 30. In other examples, external indication processing unit 72 may be external to and separate from video decoder 30.

At decoder 30, prediction module 81 checks the flag and when the flag is set treats a clean random access (CRA) picture as a broken link access (BLA) picture (604). In an example, when decoding a coded slice Network Abstraction Layer (NAL) unit, if the first flag is equal to "1" and a NAL unit type of a coded slice NAL unit indicates a CRA picture (e.g. the value is equal to "4" or "5" per HEVC WD7) the external indication processing unit 72 or other unit within video decoder 30 changes the value of the NAL unit type to indicate a BLA picture (e.g. increases the value of the NAL unit type by 2 per HEVC WD7). Additionally, the prediction module 81 sets the value of a second flag to 1. If the previous picture in decoding order is a RAP picture and the rap_pic_id of the current slice is equal to the rap_pic_id of the previous picture, the following applies. If the next picture in decoding order is not a RAP picture, change the value of rap_pic_id of a current slice to be different from a rap_pic_id of the previous picture in decoding order. Otherwise, the value of the rap_pic_id of the current picture is changed to be a value that is different from the rap_pic_id of both the previous picture and the next picture in decoding order.

In another example, at video decoder 30, prediction module 81 or another unit within video decoder 30 decodes a coded slice NAL unit. If the first flag is equal to "1" and a NAL unit type of the coded slice NAL unit indicates a CRA picture (e.g. the value is equal to "4" or "5" per HEVC WD7) the prediction module (or other unit) changes the value of the NAL unit type to indicate a BLA picture (e.g. increases the value of the NAL unit type by 2 per HEVC WD7). Possibly additionally, if picture timing SEI messages are present and DPB output times for all pictures in a DPB are smaller than the DPB output time of a current picture, the prediction module 81 or other unit sets a value of a second flag to 1. Otherwise, if the value of the second flag is set to "0" and if a previous picture in decoding order is a RAP picture and a rap_pic_id of a current slice is equal to the rap_pic_id of the previous picture, the following applies. If the next picture in decoding order is not the RAP picture, the prediction module 81 or other unit changes a value of rap_pic_id of a current slice to be different from a rap_pic_id of the previous picture in decoding order. Otherwise, the value of the rap_pic_id of the prediction module or other unit changes the current picture to be a value that is different from the rap_pic_id of both the previous picture and the next picture in decoding order.

Figure 7:
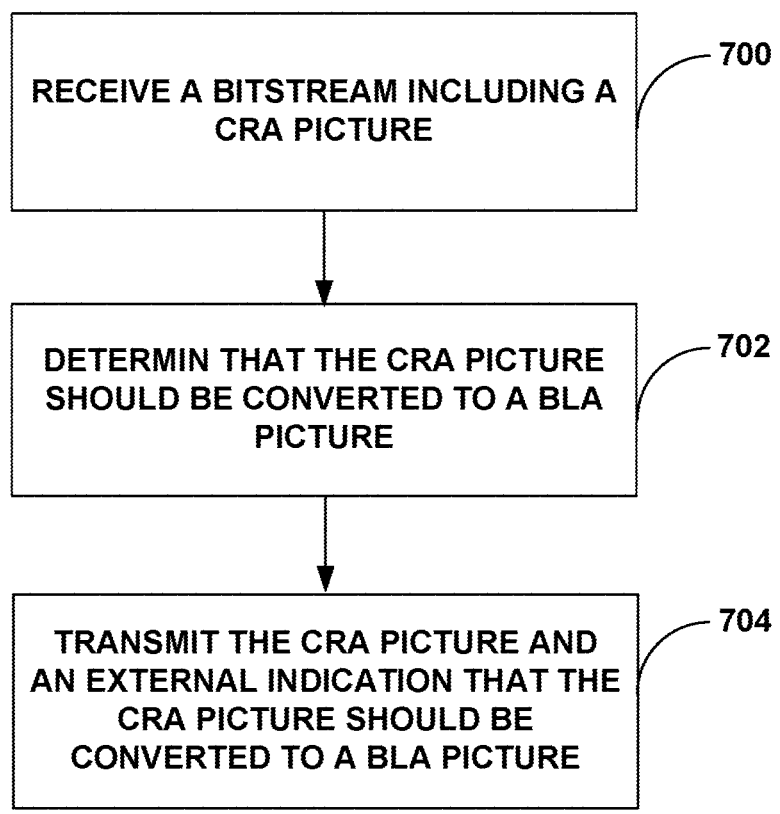
FIG. 7 is a flowchart illustrating an example method in accordance one or more examples described in this disclosure.

FIG. 7 is a flowchart illustrating an example method in accordance with one or more examples described in this disclosure. A device, such as a network device, e.g., a MANE, receives a bitstream including a CRA picture (700). The network device determines that the CRA picture should be treated as a BLA Picture (702). For example, the network device may determine that a CRA picture should be treated as a BLA picture to enable the output and/or display of more picture when output of decoded pictures earlier in decoding order than an IDR or BLA picture are all discarded after decoding of the IDR or BLA picture without output and/or display. Sometimes displaying more of those pictures may provide better user experience. Accordingly, the network device transmits the CRA picture and an external indication that the CRA Picture should be converted to a BLA Picture (704).

Figure 8:
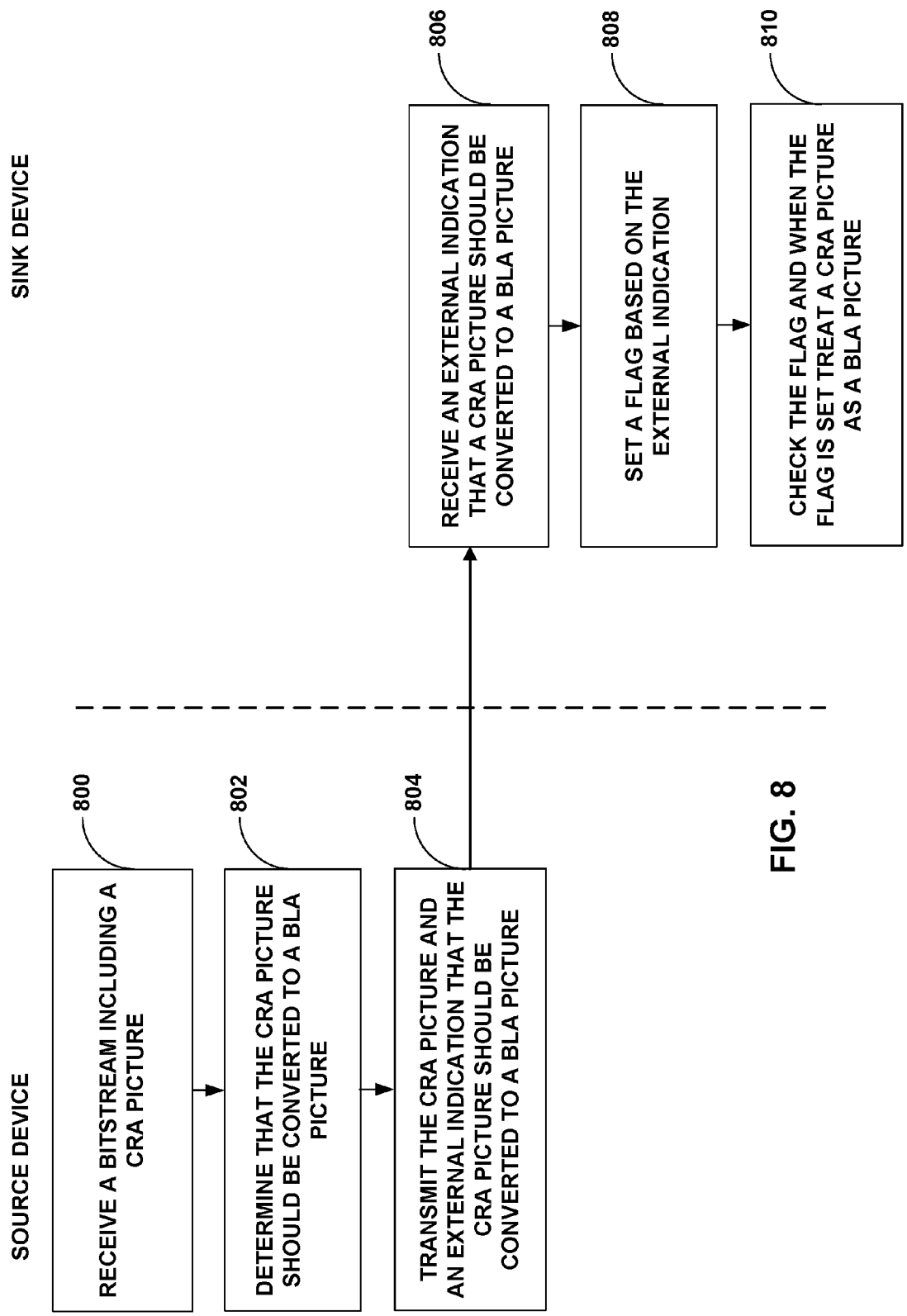
FIG. 8 is a flowchart illustrating an exemplary operation of a first device sending an external indication and responsive actions of a second device receiving the external indication.

FIG. 8 is a flowchart illustrating an exemplary operation of a first device sending an external indication and responsive actions of a second device receiving the external indication. A source device, such as a network device, e.g., a MANE, receives a bitstream including a CRA picture (800). The network device determines that the CRA picture should be treated as a BLA Picture (802). Accordingly, the network device transmits the CRA picture and an external indication that the CRA Picture should be converted to a BLA Picture (804). A video decoder 30 receives the CRA picture and the external indication 70 that the CRA picture should be converted to a BLA picture (806).

External indication processing unit 72 sets a flag 74 based on the external indication (808). The flag may then be passed to prediction module 81. In an example, external indication processing unit 72 is within video decoder 30. In other examples, external indication processing unit 72 may be external to and separate from video decoder 30. At decoder 30, prediction module 81 checks the flag and when the flag is set treats the CRA pictures as a BLA picture (810).

In the example of FIG. 8, a flag is used to indicate that an external indication has been received. In other examples, similar to FIG. 5, video decoder 30 or other device receives an external indication and then treat the CRA picture as a BLA picture based on the external indication.

In one example, a decoder changes a CRA picture to a BLA picture as a function at the decoder side. In reception or inference of such a message, one function of the decoder side may perform the change of the identified CRA picture to a BLA picture of the bitstream, before the coded picture is sent to the decoder for decoding.

A CFA picture may be changed to a BLA picture. For each coded slice NAL unit, if nal_unit_type indicates a CRA picture, e.g. the value is equal to "4" or "5" per HEVC WD7, the following applies, (1) the value of nal_unit_type is changed to indicate a BLA picture, e.g., the value is increased by 2, (2) the value of no_output_of_prior_pics_flag is set to 1, (3) if the previous picture in decoding order is a RAP picture and the rap_pic_id of the current slice is equal to the rap_pic_id of the previous picture, the following applies: (a) if the next picture in decoding order is not a RAP picture, the value of rap_pic_id of the current slice is changed to be different than the rap_pic_id of the previous picture in decoding order, but still in the allowed value range of the syntax element, or (b) otherwise (the next picture in decoding order is a RAP picture), the value of rap_pic_id of the current picture is changed to be a value that is different than the rap_pic_id of both the previous picture and the next picture in decoding order, but still in the allowed value range of the syntax element.

Handling a CRA picture as a CRA picture that starts a bitstream will now be described. An indication that a particular CRA picture should be handled as a BLA picture, as described above, may also be changed to or interpreted as an indication that a particular CRA picture should be handled as a CRA picture that is the first picture in a bitstream, provided that the changes described below are made to the HEVC draft specification.

In an example, the variable CraIsFirstPicFlag is associated with each CRA picture. The value of CraIsFirstPicFlag for some CRA pictures may be specified by external means. If a CRA picture is the first picture in the bitstream, then the value of CraIsFirstPicFlag for the CRA picture is set to 1, regardless of the value indicated by the external indication (when present). Otherwise, when the value of CraIsFirstPicFlag for the CRA picture is not specified by external means, it is set to "0."

When decoding (including parsing) each coded slice NAL unit, if CraIsFirstPicFlag is equal to "1" and nal_unit_type is equal to "4" or 5, the value of no_output_of_prior_pics_flag may be set to 1. If the previous picture in decoding order is a RAP picture and the rap_pic_id of the current slice is equal to the rap_pic_id of the previous picture, then, if the next picture in decoding order is not a RAP picture, the value of rap_pic_id of the current slice is changed to be different than the rap_pic_id of the previous picture in decoding order, but still in the allowed value range of the syntax element. Otherwise (the next picture in decoding order is a RAP picture), the value of rap_pic_id of the current picture is changed to be a value that is different than the rap_pic_id of both the previous picture and the next picture in decoding order, but still in the allowed value range of the syntax element.

Alternatively, instead of setting the value of no_output_of_prior_pics_flag may be set to 1, the prediction module 81 may, if the picture timing SEI messages are present and the DPB output times for all pictures in the DPB are smaller than the DPB output time of the current picture, the value of no_output_of_prior_pics_flag is set to 1, Otherwise if the value of no_output_of_prior_pics_flag is set to "0."

In other examples, various definitions of picture order count, tagged for discard (TFD) picture may be changed from the HEVC WD9 or other working drafts of the standard. Accordingly, the definitions provided below may be different from the standard. These definitions may not apply to some or all examples described herein.

In some examples, a coded video sequence is a sequence of access units that may include, in decoding order, of a CRA access unit that may have a CraIsFirstPicFlag equal to 1, an IDR access unit or a BLA access unit, followed by zero or more non-IDR and non-BLA access units including all subsequent access units up to but not including any subsequent IDR or BLA access unit.

In some examples, a picture order count is a variable that may be associated with each coded picture and has a value that is increasing with increasing picture position in output order relative to one of the following coded pictures: (1) the previous IDR picture in decoding order, if any (2) the previous BLA picture in decoding order, if any, and (3) the previous CRA picture in decoding order, if any and in some examples, if the previous CRA picture has CraIsFirstPicFlag equal to 1

In some examples, if more than one of the above coded pictures is present, the picture order count is relative to the last of such coded pictures in decoding order. A tagged for discard (TFD) picture: A coded picture for which each slice has nal_unit_type equal to 2; a TFD picture is associated with the previous CRA picture or BLA picture in decoding order and precedes the associated picture in output order; when the associated picture is a BLA picture, or when the associated picture is a CRA picture that may have a CraIsFirstPicFlag equal to 1, the TFD picture may not be correctly decodable and is not output.

In some examples, the semantics of no_output_of_prior_pics_flag may be changed so that the no_output_of_prior_pics_flag specifies how the previously-decoded pictures in the decoded picture buffer are treated after decoding of a CRA picture with CraIsFirstPicFlag equal to "1" or an IDR or a BLA picture.

In some examples, when the CRA picture with CraIsFirstPicFlag equal to "1" or IDR or BLA picture is the first picture in the bitstream, the value of no_output_of_prior_pics_flag has no effect on the decoding process. When the CRA picture with CraIsFirstPicFlag equal to "1" or IDR or BLA picture is not the first picture in the bitstream and the value of pic_width_in_luma_samples or pic_height_in_luma_samples or sps_max_dec_pic_buffering[sps_max_temporal_layers_minus1] derived from the active sequence parameter set is different from the value of pic_width_in_luma_samples or pic_height_in_luma_samples or sps_max_dec_pic_buffering[sps_max_temporal_layers_minus1] derived from the sequence parameter set active for the preceding picture, no_output_of_prior_pics_flag equal to "1" may (but should not be inferred by the decoder, regardless of the actual value of no_output_of_prior_pics_flag.

In some examples, a change can be made to the following in sub-clause 8.1 of HEVC WD7, e.g., change: if the first coded picture in the bitstream is a CRA picture, and the current picture is a TFD picture associated with the CRA picture, or if the previous RAP picture preceding the current picture in decoding order is a BLA picture and the current picture is a TFD picture associated with the BLA picture, PicOutputFlag is set equal to "0" and the decoding process for generating unavailable reference pictures specified in subclause 8.3.3 is invoked (only needed to be invoked for one slice of a picture) to: if a CRA picture has CraIsFirstPicFlag equal to 1, and the current picture is a TFD picture associated with the CRA picture, or if the previous RAP picture preceding the current picture in decoding order is a BLA picture and the current picture is a TFD picture associated with the BLA picture, PicOutputFlag is set equal to "0" and the decoding process for generating unavailable reference pictures specified in subclause 8.3.3 is invoked (only needed to be invoked for one slice of a picture).

In some examples, a change the following in subclause 8.3.1 of HEVC WD7 can be made, e.g., change: the current picture is a CRA picture and is the first coded picture in the bitstream to the current picture is a CRA picture with CraIsFirstPicFlag equal to 1.

In some examples, a change to the following in subclause 8.3.1 of HEVC WD7 can be made, e.g., change: if the current picture is an IDR or a BLA picture, or if the first coded picture in the bitstream is a GRA picture and the current picture is the first coded picture in the bitstream, PicOrderCntMsb is set equal to "0." Otherwise, PicOrderCntMsb is derived as specified by the following pseudo-code to if the current picture is an IDR or a BLA picture, or a CRA picture with CraIsFirstPicFlag equal to 1, PicOrderCntMsb is set equal to "0." Otherwise, PicOrderCntMsb is derived as specified by the following pseudo-code.

In some examples, a change the following in subclause 8.3.2 of HEVC WD7 may be made, e.g., change NOTE 4—There may be one or more reference pictures that are included in the reference picture set but not present in the decoded picture buffer. Entries in RefPicSetStFoll or RetPicSetLtFoll that are equal to "no reference picture" should be ignored. Unless either of the following two conditions is true, an unintentional picture loss should be inferred for each entry in RefPicSetStCurrBefore, RefPicSetStCurrAfter and RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture to NOTE 4—There may be one or more reference pictures that are included in the reference picture set but not present in the decoded picture buffer. Entries in RefPicSetStFoll or RefPicSetLtFoll that are equal to "no reference picture" should be ignored. Unless the previous RAP picture preceding the current coded picture in decoding order is a CRA picture with CraIsFirstPicFlag equal to "1" or a BLA picture, and the current coded picture is a TFD picture associated with the previous RAP picture, an unintentional picture loss should be inferred for each entry in RefPicSetStCurrBefore, RefPicSetStCurrAfter and RefPicSetLtCurr that is equal to "no reference picture."

In some examples, a change the following in subclause 8.3.2 of HEVC WD7 may be made, e.g., change: Unless either of the following conditions is true, there shall be no entry in RefPicSetStCurrBefore, RefPicSetStCurrAfter or RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture to Unless the previous RAP picture preceding the current coded picture in decoding order is a CRA picture with CraIsFirstPicFlag equal to "1" or a BLA picture, and the current coded picture is a TFD picture associated with the previous RAP picture, there shall be no entry in RefPicSetStCurrBefore, RefPicSetStCurrAfter or RetPicSetLtCurr that is equal to "no reference picture."

In some examples, a change to the first three paragraphs in subclause 8.3.3.1 of HEVC WD7 may be made as follows: this process is invoked once per coded picture, after the invocation of the decoding process for reference picture set as specified in subclause 8.3.2, when the previous RAP picture preceding the current coded picture in decoding order is a CRA picture with CraIsFirstPicFlag equal to "1" or a BLA picture, and the current coded picture is a TFD picture associated with the previous RAP picture. NOTE 1—The entire specification herein of the decoding process for TFD pictures associated with a CRA picture at the beginning of the bitstream or for TFD pictures associated with a BLA picture is only included for purposes of specifying constraints on the allowed syntax content of such pictures. In actual decoders, any TFD pictures associated with a CRA picture at the beginning of the bitstream or any TFD pictures associated with a BLA picture may simply be ignored (removed from the bitstream and discarded), as they are not specified for output and have no effect on the decoding process of any other pictures that are specified for output. When the previous RAP picture preceding the current coded picture in decoding order is a CRA picture with CraIsFirstPicFlag equal to "1" or a BLA picture, and the current coded picture is a TFD picture associated with the previous RAP picture, the following applies.

In some examples, a change the following in subclause C.4 of HEVC WD7 may be made, e.g., change: NOTE 1—This constraint guarantees decodability of a TFD picture if its associated RAP picture is a CRA picture and if that CRA picture is not the first coded picture in the bitstream to NOTE 1—This constraint guarantees decodability of a TFD picture if its associated RAP picture is a CRA picture and if that CRA picture has CraIsFirstPicFlag equal to "0."

In some examples, a change to the third paragraph in subclause C.3.1 of HEVC WD7 may be made as follows: If the current picture is CRA picture with CraIsFirstPicFlag equal to "1" or an IDR or a BLA picture, the following applies when the CRA picture with CraIsFirstPicFlag equal to "1" or IDR or BLA picture is not the picture decoded and the value of pic_width_in_luma_samples or pic_height_in_luma_samples or sps_max_dec_pic_buffering[i] for any possible value of i derived from the active sequence parameter set is different from the value of pic_width_in_luma_samples or pic_height_in_luma_samples or sps_max_dec_pic_buffering[i] derived from the sequence parameter set that was active for the preceding picture, respectively, no_output_of_prior_pics_flag is inferred to be equal to "1" by the HRD, regardless of the actual value of no_output_of_prior_pics_flag. NOTE 1—Decoder implementations should try to handle picture or DPB size changes more gracefully than the HRD in regard to changes in pic_width_in_luma_samples, pic_height_in_luma_samples, or sps_max_dec_pic_buffering[i]. When no_output_of_prior_pics_flag is equal to "1" or is inferred to be equal to 1, all picture storage buffers in the DPB are emptied without output of the pictures they contain, and DPB fullness is set to "0."

In some examples, a change to the entire subclause C.5.2 of HEVC WD7 may be made as follows, the removal of pictures from the DPB before decoding of the current picture (but after parsing the slice header of the first slice of the current picture) happens instantaneously when the first decoding unit of the access unit containing the current picture is removed from the CPB and proceeds as follows: The decoding process for reference picture set as specified in subclause 8.3.2 is invoked. If the current picture is a CRA picture with CraIsFirstPicFlag equal to "1" or an IDR or a BLA picture, the following applies. When the CRA picture with CraIsFirstPicFlag equal to "1" or IDR BLA picture is not the first picture decoded and the value of pic_width_in_luma_samples or pic_height_in_luma_samples or sps_max_dec_pic_buffering[i] for any possible value of i derived from the active sequence parameter set is different from the value of pic_width_in_luma_samples or pic_height_in_luma_samples or sps_max_dec_pic_buffering[i] from the sequence parameter set that was active for the preceding picture, respectively, no_output_of_prior_pics_flag is inferred to be equal to "1" by the HRD, regardless of the actual value of no_output_of_prior_pics_flag. NOTE—Decoder implementations should try to handle picture or DPB size changes more gracefully than the HRD in regard to changes in pic_width_in_luma_samples, pic_height_in_luma_samples or sps_max_dec_pic_buffering[i]. When no_output_of_prior_pics_flag is equal to "1" or is inferred to be equal to 1, picture storage buffers in the DPB are emptied without output of the pictures they contain. Otherwise, picture storage buffers containing a picture which are marked as "not needed for output" and "unused for reference" are emptied (without output). When one or more of the following conditions are true, the "bumping" process specified in subclause C.5.2.1 is invoked repeatedly until there is an empty picture storage buffer to store the current decoded picture. The number of pictures in the DPB that are marked as "needed for output" is greater than sps_num_reorder_pics[temporal_id]. The number of pictures in the DPB with temporal_id lower than or equal to the temporal_id of the current picture is equal to sps_max_dec_pic_buffering[temporal_id].

In some examples, when the current picture is a CRA picture with CraIsFirstPicFlag equal to "1" or an IDR or a BLA picture for which no_output_of_prior_pics_flag is not equal to "1" and is not inferred to be equal to 1, the following two steps are performed. Picture storage buffers containing a picture that is marked as "not needed for output" and "unused for reference" are emptied (without output). All non-empty picture storage buffers in the DPB are emptied by repeatedly invoking the "bumping" process specified in subclause C.5.2.1.

Some examples may include a "bumping" process. The "bumping" process may be invoked in the following cases: (1) the current picture is a CRA picture with CraIsFirstPicFlag, equal to "1" or an IDR or a BLA picture and no_output_of_prior_pics_flag is not equal to "1" and is not inferred to be equal to 1, as specified in subclause C.5.2, (2) the number of pictures in the DPB that are marked "needed for output" is greater than sps_num_reorder_pics[temporal_id], as specified in subclause C.5.2, and (3) the number of pictures in the DPB with temporal_id lower than or equal to the temporal_id of the current picture is equal to sps_max_dec_pic_buffering[temporal_id], as specified in subclause C.5.2.

The "bumping" process may include the following ordered steps: (1) the picture that is first for output is selected as the one having the smallest value of PicOrderCntVal of all pictures in the DPB marked as "needed for output," (2) the picture is cropped, using the cropping rectangle specified in the active sequence parameter set for the picture, the cropped picture is output, and the picture is marked as "not needed for output," (3) if the picture storage buffer that included the picture that was cropped and output contains a picture marked as "unused for reference", the picture storage buffer is emptied.

In some examples, with the above changes to the HEVC draft specification, it may be possible to further remove all texts for support of BLA pictures.

An improved output of pictures will now be described. In an example, it is proposed that no_output_of_prior_pics_flag is changed to output_all_prior_pics_flag, this flag equal to "1" has the equivalent meaning when no_output_of_ prior_pics_flag is equal to "0." When this flag is equal to "0," furthermore, the number of prior pictures that may be used for output/display is signalled as num_output_pics.num_output_pics may be signalled as u(v), this syntax element is in the range of 0 to MaxDpbSize, exclusive. The num_output_pics pictures to be output/displayed are the pictures having closer display orders to the BLA or IDR picture and in the first bitstream. num_output_pics may be related to the number of leading pictures that do not need to be outputted.

Alternatively, num_output_pics may be signalled as ue(v). Alternatively, no_output_of_prior_pics_flag, output_all_prior_pics_flag, or num_output_pics is not signalled and num_prior_discard_pics is directly signalled as u(v) ue(v) num_prior_discard_pics is in the range of 0 to MaxDpbSize, exclusive. It indicates the number of the prior pictures to be discarded. The num_prior_discard_pics pictures to be discarded (thus not displayed) are the pictures having farther display orders to the BLA or IDR picture and in the first bitstream.

Alternately, an SEI message may be added during the splicing to indicate the additional memory, in terms of number of the frames in the first bitstream, required to display all the pictures in the first bitstream which haven't been displayed.

Signaling of picture timing will now be described. The indication of one or more of different timing information, e.g. the earliest presentation time (i.e., the earliest DPB output time) and the smallest picture order count value of all TFD pictures associated with one DLA or CRA picture, may be included in the bitstream. The information may be included in one or more of the slice header and an SEI message (e.g. the recovery point SEI message or buffering period SEI message or picture timing SEI message). One or more of the following syntax elements may be included in the slice header of a RAP picture or an SEI message associated with a RAP picture to signal the information: (1) delta_earliest_presentation_time, indicating the difference between the DPB output time of the RAP picture and the earliest DPB output time of any picture when the RAP picture is the first picture in the bitstream (i.e., the earliest DPB output time of all DLPs associated with the RAP picture), in units of clock ticks as specified in Annex C of HEVC WD7. The syntax element may be u(v) coded, and the number of bits used to represent the syntax element is cpb_removal_delay_length_minus1+1 bits. The value "0" indicates that the RAP picture has no associated DLPs, (2) delta_earliest_poc, indicating the difference between the PicOrderCntVal value of the RAP picture and the smallest PicOrderCntVal value of any picture when the RAP picture is the first picture in the bitstream (i.e., the smallest earliest PicOrderCntVal value of all DLPs associated with the RAP picture). The syntax element may be ue(v) coded, and the value range may be 0 to MaxPicOrderCntLsb/2−1, inclusive.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

In some examples, either the message or the syntax element includes one of the following: (1) a delta_earliest_presentation_time, indicating a time difference associated with the one or more CRA treated as BRA pictures; or (2) a delta_earliest_poc, indicating a difference in picture order value associated with the one or more CRA treated as BRA pictures.

In still other examples, this disclosure contemplates a computer readable medium comprising a data structure stored thereon, wherein the data structure includes an encoded bitstream consistent with this disclosure. In particular, the data structures may include the NAL unit designs described herein.

In an example, a CRA picture may be treated as BRA pictures. The video decoder 30 may change a value of a network abstraction layer (NAL) type, set a value that controls output of prior pictures, and change a picture identification (ID) value associated with a next picture. Video decoder 30 may receive a syntax element to indicate a switching operation. The syntax element or message that is part of a compressed bitstream and the switching operation instructs a decoder to treat one or more CRA pictures as BRA pictures. The decoder may then decode the bitstream based in part on the syntax element.

In an example, a video encoder 20 may generate a syntax element or a message to indicate a switching operation. The switching operation instructs a decoder to treat one or more CRA pictures as BRA pictures. Video encoder 20 may send the syntax element to a decoding device as part of a compressed bitstream.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving via out-of-band signaling with respect to signaling associated with receipt of a video bitstream, at a video decoding device, a message comprising an external indication from a source device external to the video decoding device;
   receiving, at the video decoding device, the video bitstream, wherein the video bitstream comprises compressed video data and wherein the video bitstream is received separately from the message comprising the external indication;
   setting a value of a HandleCraAsBla flag to a value specified by the message, the HandleCraAsBla flag being indicative of whether a clean random access (CRA) picture is to be processed as a broken link access (BLA) picture;
   processing the CRA picture as a BLA picture based on the value of the HandleCraAsBla flag; and
   based on the value of the HandleCraAsBla flag, setting a value of a second flag, the second flag being indicative of whether at least one picture decoded prior to decoding of the CRA picture is to be output.

2. The method of claim 1, wherein a default value of the HandleCraAsBla flag indicates that the CRA picture is not to be processed as a BLA picture.

3. The method of claim 1, further comprising, based on the HandleCraAsBla flag being set to a value of 1, setting the value of the second flag to a value of 1.

4. The method of claim 1, wherein the message indicates that a bitstream switching operation has occurred at the CRA picture.

5. A video decoding device, comprising:
   memory configured to store video data; and
   a processor in communication with the memory, the processor configured to:
      receive via out-of-band signaling with respect to signaling associated with receipt of a video bitstream, at the video decoding device, a message comprising an external indication from a source device external to the video decoding device;
      receive, at the video decoding device, the video bitstream, wherein the video bitstream comprises compressed video data and wherein the video bitstream is received separately from the message comprising the external indication;

set a value of a HandleCraAsBla flag to a value specified by the message, the HandleCraAsBla flag being indicative of whether a clean random access (CRA) picture is to be processed as a broken link access (BLA) picture;

process the CRA picture as a BLA picture based on the value of the HandleCraAsBla flag; and based on the value of the HandleCraAsBla flag, set a value of a second flag, the second flag being indicative of whether at least one picture decoded prior to decoding of the CRA picture is to be output.

6. The video decoding device of claim 5, wherein a default value of the HandleCraAsBla flag indicates that the CRA picture is not to be processed as a BLA picture.

7. The video decoding device of claim 5, the processor further configured to, based on the first flag being set to a value of 1, set the value of the second flag to a value of 1.

8. The video decoding device of claim 5, wherein the video decoding device comprises at least one of: an integrated circuit, a microprocessor, a digital signal processor (DSP), a field programmable gate array (FPGA), a desktop computer, a laptop computer, a tablet computer, a set-top box, a wireless communication device, a smart phone, a television, a camera, a display device, a digital media player, a video gaming console, or a video streaming device.

9. The video decoding device of claim 5, further comprising a display in communication with the processor, wherein the display is configured to display the video data.

10. The video decoding device of claim 5, wherein the message is indicative of an occurrence of a bitstream switching operation at the CRA picture.

11. A non-transitory computer-readable storage medium having stored thereon instructions that, when executed, cause one or more processors of a video decoding device to:

receive via out-of-band signaling with respect to signaling associated with receipt of a video bitstream, at the video decoding device, a message comprising an external indication from a source device external to the video decoding device;

receive, at the video decoding device, the video bitstream, wherein the video bitstream comprises compressed video data and wherein the video bitstream is received separately from the message comprising the external indication;

set a value of a HandleCraAsBla flag to a value specified by the message, the HandleCraAsBla flag being indicative of whether a clean random access (CRA) picture is to be processed as a broken link access (BLA) picture;

process the CRA picture as a BLA picture based on the value of the HandleCraAsBla flag; and based on the value of the HandleCraAsBla flag, set a value of a second flag, the second flag being indicative of whether at least one picture decoded prior to decoding of the CRA picture is to be output.

12. The computer-readable storage medium of claim 11, wherein the medium further has stored thereon instructions that, when executed, cause the one or more processors of the video decoding device to determine that a default value of the HandleCraAsBla flag indicates that the CRA picture is not to be processed as a BLA picture.

13. The computer-readable storage medium of claim 11, wherein the medium further has stored thereon instructions that, when executed, cause the one or more processors of the video decoding device to output the video data for display on a display device.

* * * * *